United States Patent

[11] 3,578,920

[72] Inventors Noriaki Okamoto
Kanagawa-ken;
Teruo Wakabe, Tokyo; Kazuo Nozawa,
Chiba-ken, Japan
[21] Appl. No. 806,477
[22] Filed Mar. 12, 1969
[45] Patented May 18, 1971
[73] Assignee Sony Corporation
Tokyo, Japan
[32] Priority Mar. 15, 1968
[33] Japan
[31] 43/16853

[54] FERRITE MAGNETIC HEAD WITH GAP SPACER OF SILICON OXIDE AND METAL OXIDES
3 Claims, 5 Drawing Figs.

[52] U.S. Cl. ........ 179/100.2C, 29/603
[51] Int. Cl. ........ G11b 5/24, G11b 5/42
[50] Field of Search ........ 179/100.2 (C); 29/603

[56] References Cited
UNITED STATES PATENTS

| | | | |
|---|---|---|---|
| 3,375,575 | 4/1968 | Visser | 179/100.2 |
| 3,376,397 | 4/1968 | Noorlander | 179/100.2 |
| 3,412,217 | 11/1968 | Bygdnes | 179/100.2 |
| 3,458,926 | 8/1969 | Maissel | 179/100.2 |

*Primary Examiner*—James W. Moffitt
*Assistant Examiner*—J. Russell Goudeau
*Attorneys*—Albert C. Johnston, Robert E. Isner, Lewis H. Eslinger and Alvin Sinderbrand

ABSTRACT: A magnetic head has a gap spacer between magnetic core members thereof, which spacer is constituted by at least one layer of a nonmagnetic metal oxide formed over a protective layer, such as, silica dioxide, on a gap-defining surface of the magnetic core members. The metal oxide layer is formed over the protective layer by heating on the latter an acid solution of a nonmagnetic metal halide or a solution of an organic metal salt, during which heating the protective layer prevents oxidation and etching of the underlying gap-defining surface.

Patented May 18, 1971 3,578,920

Figure 1:
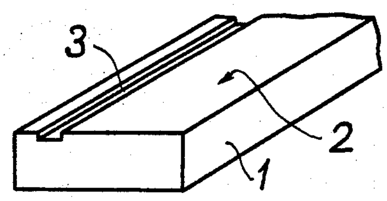

INVENTORS
NORIAKI OKAMOTO
TERUO WAKABE
KAZUO NOZAWA

BY Lewis H. Eslinger ATTORNEY

FERRITE MAGNETIC HEAD WITH GAP SPACER OF SILICON OXIDE AND METAL OXIDES

This invention relates generally to magnetic recording and reproducing heads and to the manufacture thereof, and more particularly is directed to improvements in the gap spacers of magnetic heads by which the resistance to abrasion and heat is enhanced.

In magnetic heads for magnetic tape recorders, the shape of the gap provided in the head surface engaging the magnetic tape has a great influence upon the recording and playback response, and accordingly the mechanical precision of the gap should be held constant at all times. This requires a mirror finish on the gap forming surfaces of the magnetic core and the mechanically rigid coupling to such surfaces of a nonmagnetic spacer therebetween. Further, it is desirable that the spacer itself be of great mechanical strength.

In the case of video tape recorders having rotary magnetic heads, the temperature of the tape contact surface of each of the heads may rise as high as several hundred degrees C., which may place a severe strain on the mechanical coupling of the spacer with the magnetic core. Therefore, it is desired that the coefficients of thermal expansion of the magnetic core and of the spacer should be substantially equal to each other. Further, it is necessary that any method provided for making such magnetic heads be suitable for mass production. In the past, it has been the practice to provide the spacer by inserting a nonmagnetic foil, such as, of mica, beryllium, copper or the like, between the gap forming surfaces of the magnetic core. However, this method involves the quite troublesome process of selecting nonmagnetic foils of uniform thickness to constitute the gap spacers, which, of course, makes it difficult to mass produce magnetic heads of uniform gap width, especially when the heads are to have narrow gaps. It has also been proposed to provide the spacer by forming a nonmagnetic layer on each of the gap forming surfaces of the magnetic core by means of spattering or vapor deposition. In this latter method, it is difficult to accurately control the thickness of the spacer, and not many wear-resisting and heat-resisting materials are well suited for the formation of the spacer on the gap forming surfaces by spattering or vapor deposition. Further, where the spacer is deposited by spattering or vapor deposition, the mechanical coupling of the spacer with the gap forming surfaces is not so strong. Thus, the described prior art methods for the construction of magnetic heads do not adequately satisfy the requirements mentioned above.

Accordingly, it is an object of this invention to provide a long-lived magnetic head of excellent characteristics.

Another object is to provide a magnetic head with a mechanically strong gap spacer having a coefficient of thermal expansion similar to that of the core.

A further object of this invention is to provide a method of making magnetic heads with gap spacers having the foregoing characteristics, and by which the gap width may be easily and accurately controlled.

In accordance with an aspect of this invention, a gap spacer is provided by a layer or layers of a nonmagnetic metal oxide which has an extremely high mechanical strength and hardness, and which has a coefficient of thermal expansion of the same order as that of the core material, such as, ferrite. Suitable nonmagnetic metal oxides include oxides of tin Sn, zinc Zn, cadmium Cd, indium In, lead Pb, antimony Sb, silicon Sn, titanium Ti, and mixtures thereof. Each such layer of nonmagnetic metal oxide is produced by hydrolysis or thermal dissociation on a magnetic core member of an acid solution of a nonmagnetic metal halide, for example, halides of tin Sn, zinc Zn, cadmium Cd, indium In, lead Pb, antimony Sb, silicon Si or mixtures thereof, or of a solution of an organic metal salt, for example, $(CH_3)$, $SnCl_2$ or $Ti(OC_4H_9)_4$.

Although a spacer of a nonmagnetic metal oxide produced as above has the desired high strength and hardness, for example, from 700 to 1000 Vickers hardness, and a coefficient of thermal expansion of the same order as that of a ferrite core, for example, a coefficient of $5.2\times10^{16}$ for a gap spacer of $SnO_2$ as compared with a coefficient of 9.3 to $10.2\times10^{16}$ for ferrite, the production of the nonmagnetic metal oxide by hydrolysis, and partly by thermal dissociation of the acid solution of a nonmagnetic metal halide requires heating of the latter to 400 to 600°C. Such heating could lead to oxidation of the gap forming surfaces of the magnetic core, with resultant deterioration of the magnetic characteristics, increase in the effective gap width and decrease in the mechanical strength of the core. Although the described oxidation could be avoided by effecting the hydrolysis in an inert gas atmosphere, this would introduce complexity into the manufacture of the heads. Further, even in an inert gas atmosphere, hydrochloric acid $HCl$ vapor is yielded by the hydrolysis or thermal dissociation of the acid solution of the nonmagnetic metal halide, and, if that vapor touches the magnetic core, it causes so-called vapor etching and, as a result, the gap forming surfaces previously subjected to mirror finishing are roughened.

Thus, it is a further feature of this invention to provide, between each layer of nonmagnetic metal oxide and the gap forming surface of the magnetic core on which the nonmagnetic metal oxide is produced, a protective layer of a nonmagnetic material which is sufficiently heat resistant to withstand the temperatures employed for forming the metal oxide layer and which is also etch resistant, for example, a protective layer of silicon dioxide. With such protective layer initially formed on a gap forming surface of the magnetic core, an acid solution of a nonmagnetic metal halide can be heated on the protective layer to produce the desired spacer of a nonmagnetic metal oxide without the danger of oxidation or etching of the underlying gap forming surface.

By reason of the speed with which the nonmagnetic metal oxide layer and the underlying protective layer can be formed on a gap forming surface of the magnetic core member, and the accuracy with which the thicknesses of such layers can be controlled, magnetic heads having gap spacers constituted by the described nonmagnetic metal oxide layers are ideally suited to be mass produced.

Figure 5:
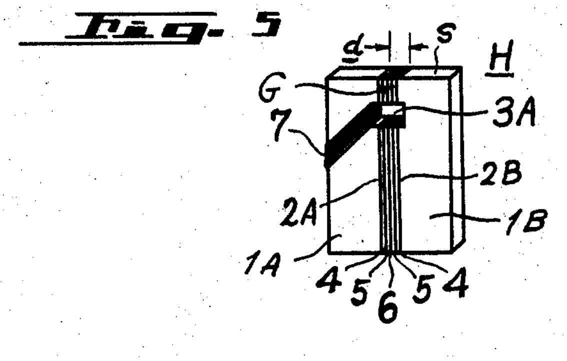

The above, and other objects, features and advantages of this invention, will be apparent in the following detailed description of illustrative embodiments thereof which is to be read in connection with the accompanying drawing, wherein:

FIGS. 1 to 4 are perspective views illustrating successive steps in the production of a magnetic head according to this invention; and FIG. 5 is a perspective view of a completed magnetic head according to this invention.

Referring to the drawing in detail, and initially to FIG. 5 thereof, it will be seen that a magnetic head H according to this invention, as there shown, may comprise a pair of magnetic members 1A and 1B, for example, of ferrite, which together constitute a magnetic core. The magnetic members 1A and 1B have confronting, spaced apart surfaces 2A and 2B to define a gap G therebetween, and the surfaces 2A and 2B have registering cutouts to define an opening 3A which separates the front and rear portions of gap G that are respectively adjacent to, and remote from the surface S of the head intended to contact the tape or other magnetic medium during recording or reproduction of a signal.

In accordance with this invention, the width of gap G, that is, the distance *d* across the gap in the direction of relative movement of the head H and the tape or magnetic recording medium, is established accurately and permanently maintained by a spacer in such gap that is constituted by at least one nonmagnetic metal oxide layer 5 formed on the gap-defining surface 2A or 2B of at least one of the magnetic members 1A or 1B with a protective layer 4, for example of silicon dioxide, interposed between the metal oxide layer 5 and the respective gap-defining surface. In the embodiment as shown on FIG. 5, each of the gap-defining surfaces 2A and 2B has a protective layer 4 thereon and a nonmagnetic metal oxide layer 5 covering the protective layer 4, and an adhesive binder 6 permanently bonds together the layers 5, at least in the rear portion of gap G remote from surface S, whereby to provide a unitary structure. Finally, a coil 7 is wound around one of the magnetic members 1A and 1B and through the opening 3A to complete the head H.

When each layer 5 is formed of an oxide of tin, cadmium, indium, antimony, or titanium, or mixtures thereof, the resulting gap spacer has the desired high strength and hardness and a coefficient of thermal expansion of the same order as that of the magnetic members 1A and 1B, so that such gap spacer securely maintains the desired gap width *d* for a long period of operation even if such operation is accompanied by sharp increases in temperature.

The method of making magnetic heads according to this invention, for example, heads having the gap spacer structure described above with reference to FIG. 5, will be further illustrated by reference to the following specific examples:

EXAMPLE 1

An elongated block 1 having a rectangular cross section is cut from a magnetic material, specifically from a ferrite single crystal, as that one of the relatively wide surfaces extending along block 1, for example, the surface 2 thereof, lies in the plane (100) of the crystal. A groove 3 is formed lengthwise in the surface 2 (FIG. 1) preferably at a lateral location that is closer to one of the longitudinal edge of block 1 than to the opposite longitudinal edge, and then the surface 2 is given a mirrorlike finish. Thereafter, the surface 2 may be etched away by a dilute hydrochloric acid solution to a depth of several hundred microns so as to remove a layer of block 1 that has been affected by the finishing of surface 2.

Figure 2:
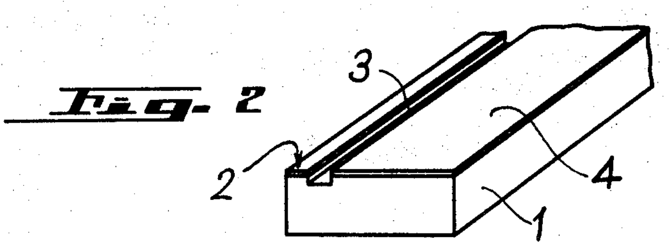

Then, the magnetic block 1 is placed in a vacuum chamber and is heated up to about 400° C., at which temperature silicon oxide SiO is vapor-deposited on surface 2 to a thickness of approximately several hundred angstroms to form thereon a protective layer 4 (FIG. 2). After this, the magnetic block 1 is removed from the vacuum chamber and is preheated, for example, up to 200° C. to 400° C. With block 1 being thus preheated, an acid solution of a nonmagnetic metal halide is applied to the layer 4 on surface 2 by means of spraying or vapor deposition. Such solution has the following composition:

$SnCl_4 \cdot 5H_2O$ 100 gr.
$InCl_3$ 50 gr.
$SbCL_3$ 10 gr.
$HCl$ [12–N] 10 c.c.
$H_2O$ 50 c.c.

Figures 3, 4:
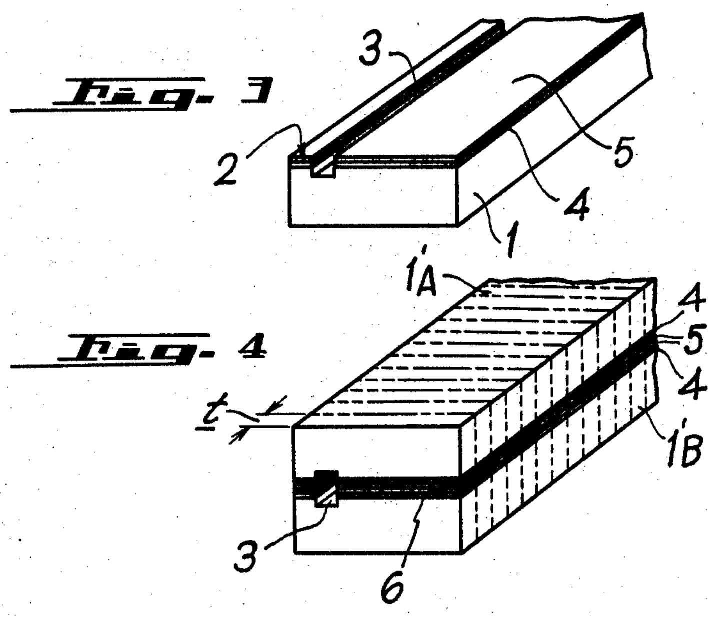

With the solution thus applied over layer 4, block 1 is heated again up to 400° C. to 600° C., preferably to about 450° C., by which a compound oxide layer 5 of $SnO_2$–$InO_2$–$Sb_2O_3$ is provided in crystal form primarily by hydrolysis (partly by thermal dissociation) on the layer 4 covering surface 2 (FIG. 3). The layer 5 has a thickness of 4000 angstroms after 20 minutes of heating to the indicated temperature and is found, by electron diffraction, to consist of a nonmagnetic compound oxide.

After the compound oxide layer 5 of $SnO_2$–$InO_2$–$Sb_2O_3$ is thus formed, the block 1 is cut in two, for example, in a median plane at right angles to its lengthwise direction, to provide a pair of magnetic members 1'A and 1'B which are assembled together, as a unitary structure, with their compound oxide layers 5 facing each other and being bonded together by an adhesive binder 6 applied between the portions of layers 5 extending from grooves 3 to the longitudinal edges farthest therefrom (FIG. 4). Following this, the resulting assembled structure is severed along planes at right angles to its lengthwise direction and spaced apart by a predetermined thickness *t*, as indicated by broken lines on FIG. 4, thus providing individual elements, each constituted by a pair of magnetic members 1A and 1B and a gap spacer therebetween. Finally, a coil 7 is wound on each such element through the groove 3A, thus providing the magnetic head H (FIG. 5).

EXAMPLE 2

The above described steps of Example 1 are performed, but with the nonmagnetic metal oxide layer 5 being formed by heating, on layer 4, of a solution having the following composition:

$SnCL_4 \cdot H_2O$ 100 gr.
$InCl_3$ 20 gr.
$HCl$ 10 c.c.
$H_2O$ 50 c.c.

In this case, a compound oxide layer of $SnO_2$–$InO_2$ is grown in crystal form on the protective layer 4 overlying the surface 2 of magnetic block 1.

In solutions of $SnCl_4 \cdot 5H_2O$ to be used in the method according to this invention, for each 10 parts, by weight, of $SnCl_4 \cdot 5H_2O$ in the solution, there is also provided therein from two to 10 parts, by weight, of $InCl_3$ and/or, if desired, a maximum of one part, by weight, of S*b*$SbCl_3$.

EXAMPLE 3

The above described steps of Example 1 are repeated, but with the nonmagnetic metal oxide layer 5 being formed by heating of a solution having the following composition:

$SnCl_4 \cdot H_2O$ 300 gr.
S*b*$SbCl_3$ 3 gr.
$HCl$ 33 c.c.
$H_2O$ 105 c.c.
$C_2H_5OH$ 45 c.c.

The resulting nonmagnetic compound oxide layer 5 is of $SnO_2 \cdot SbO_3$ and the $C_2H_5OH$ in the above composition is provided to control the reaction speed.

EXAMPLE 4

The above described steps of Example 1 are repeated, but with the nonmagnetic metal oxide layer being formed by heating of a solution having the following composition:

$CdCl_2 \cdot 2H_2O$ 100 gr.
$InCl_3$ 2 gr.
$H_2O$ 50 c.c.
$HCl$ [12–N] 10 c.c.
$C_2H_5OH$ 15 c.c.

In this case a compound oxide layer 5 of $CdO$–$In_2O_3$ is formed.

In a modification of this example, the structure of FIG. 4 is assembled from two block sections 1'A and 1'B of which only one of the block sections has been provided with the nonmagnetic compound oxide layer of $CdO$–$In_2O_3$, as aforesaid. Thus, in this modification, the gap spacer of the resulting magnetic head has only a single nonmagnetic metal oxide layer.

EXAMPLE 5

The above described steps of Example 1 are repeated, but with the nonmagnetic metal oxide layer being formed by heating of a solution having the following composition:

$(CH_3)_2SnCl_2$ 100 gr.
$H_2O$ 80 c.c.

The above solution produces an oxide layer 5 of $SnO_2$. Nonmagnetic organic metal salts other than $(CH_3)_2SnCl_2$ can be used with substantially the same results.

EXAMPLE 6

The above described steps of Example 1 are repeated, but with the nonmagnetic metal oxide layer being formed by heating of a solution having the following composition:

$(CH_3)_2SnCl_2$ 70 gr.
$Ti(OC_4H_9)_4n$ 10 c.c.
$CH_3(CH_2)_2CHOH$ 100 c.c.

The metal oxide layer 5 thus formed consists of Sn $SnO_2$–$TiOb$-2.

EXAMPLE 7

The steps of Example 1 are repeated, but with the nonmagnetic metal oxide layer being formed by heating of a solution having the following composition:

$(CH_3)_2SnCl_2$ 100 gr.
$InCl_3$ 40 gr.
$SbCl_3$ 10 gr.
HCl [12-N] 10 c.c.
$H_2O$ 50 c.c.

The oxide layer 5 thus formed consists of $SnO_2$–$InO_2$–$Sb_2O_3$.

In each of the above embodiments of the invention, the gap spacer is constituted by one or more nonmagnetic metal oxide layers, so that the spacer is mechanically strong and can be readily produced with high precision. Further, its coefficient of thermal expansion is substantially equal to that of the ferrite constituting the magnetic core and, accordingly, even if the temperature of the gap forming portion rises appreciably, as in the case of a rotary magnetic head, the gap forming portion is not damaged due to the difference between the coefficients of thermal expansion of the magnetic core and the spacer. In addition, even if the formation of the nonmagnetic metal oxide layer is carried out in the open air, the silicon dioxide layer 4 protects the magnetic core from oxidation, thereby to prevent an increase in the effective width of the gap and a decrease in the mechanical strength of the magnetic core. Thus, the present invention ensures the production of magnetic heads which are mechanically strong, stable in operation and possessed of excellent magnetic characteristics. Further, during the formation of the nonmagnetic metal oxide layer, the magnetic core is protected by layer 4 from being etched by HCl, so that the gap defining surfaces remain mirror-smooth and the gap width does not change.

Although the coefficient of thermal expansion of the silicon oxide $SiO_2$ used for protective layer 4 is appreciably different from that of ferrite, the thickness of the protective layer 4 may be several hundred to 1,000 angstroms which is required to serve as the protective layer, and accordingly the gap defining surface of the magnetic head is not damaged even in the case of appreciable temperature change.

Although the present invention has been described in connection with the fabrication of magnetic heads having cores of ferrite, it will be apparent that the invention is similarly applicable to magnetic heads having cores formed of an alloyed material such as Fe–Ni, Fe–Al, Fe–Al–Si or the like or in which pole pieces are formed of a material different from that of other portions of the core.

While in the foregoing embodiments of the invention, a pair of magnetic core halves, that is, the magnetic cores 1A and 1B, have the nonmagnetic metal oxide layers formed on their gap defining surfaces 2A and 2B and then are assembled together as a unitary structure, it is also possible to form the nonmagnetic metal oxide layer on only one of the magnetic core halves, or to omit the nonmagnetic metal oxide layer from the rear portions of the gap defining surfaces, that is, from the portions of such surfaces at the side of opening 3A remote from surface S.

Although various specific embodiments of the invention have been described in detail herein, it is to be understood that the invention is not limited to those precise embodiments, and that the above mentioned and other modifications may be effected therein by one skilled in the art without departing from the scope or spirit of the invention.

We claim:

1. In a magnetic head comprising ferrite magnetic members having confronting surfaces defining a gap therebetween, and spacer means in said gap constituted by a relatively thin protective layer consisting of silicon oxide on at least one of said surfaces to resist oxidation and etching of the respective magnetic member and a relatively thicker nonmagnetic metal oxide layer on said protective layer selected from the group consisting of oxides of tin, indium, antimony, titanium, cadmium and mixtures thereof.

2. A magnetic head according to claim 1, in which each of said surfaces has said protective layer thereon, and each protective layer has said nonmagnetic metal oxide layer thereon.

3. A magnetic head according to claim 2, in which said surfaces have registering cutouts therein to define an opening, and the nonmagnetic metal oxide layers are adhesively bonded to each other at one side of said opening.